United States Patent
Yi et al.

(10) Patent No.: US 10,172,162 B2
(45) Date of Patent: Jan. 1, 2019

(54) METHOD FOR PERFORMING A RANDOM ACCESS PROCEDURE IN WIRELESS COMMUNICATION SYSTEM AND A DEVICE THEREFOR

(71) Applicant: LG ELECTRONICS INC., Seoul (KR)

(72) Inventors: Seungjune Yi, Seoul (KR); Sunyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/415,704

(22) Filed: Jan. 25, 2017

(65) Prior Publication Data

US 2017/0215207 A1    Jul. 27, 2017

Related U.S. Application Data

(60) Provisional application No. 62/286,983, filed on Jan. 26, 2016, provisional application No. 62/291,533, filed on Feb. 5, 2016.

(51) Int. Cl.
*H04W 74/08* (2009.01)
*H04L 5/00* (2006.01)
*H04W 28/20* (2009.01)
*H04W 72/04* (2009.01)
*H04W 88/02* (2009.01)

(52) U.S. Cl.
CPC ....... *H04W 74/0833* (2013.01); *H04L 5/0005* (2013.01); *H04L 5/0053* (2013.01); *H04L 5/0092* (2013.01); *H04W 28/20* (2013.01); *H04W 72/042* (2013.01); *H04W 72/0446* (2013.01); *H04W 88/02* (2013.01)

(58) Field of Classification Search
CPC .................................................. H04W 74/0833
See application file for complete search history.

(56) References Cited

FOREIGN PATENT DOCUMENTS

| KR | 1020150043963 | 4/2015 |
| WO | 2012150809 | 11/2012 |
| WO | 2015012666 | 1/2015 |

OTHER PUBLICATIONS

PCT International Application No. PCT/KR2017/000873, Notification of Transmittal of the International Search Report and the Written Opinion of the International Searching Authority, or Declaration dated Apr. 17, 2017, 11 pages.

(Continued)

*Primary Examiner* — Shukri Taha
(74) *Attorney, Agent, or Firm* — Lee Hong Degerman Kang Waimey

(57) ABSTRACT

The present invention relates to a wireless communication system. More specifically, the present invention relates to a method and a device for performing a random access procedure in wireless communication system, the method comprising: transmitting a random access preamble (RAP) on a physical random access channel (PRACH) resource in a radio frame; calculating a random access-radio network temporary identifier (RA-RNTI) by considering time-frequency resource associated with the PRACH resource and an index of a first radio frame of the PRACH resource; and monitoring a physical downlink control channel (PDCCH) identified by the calculated RA-RNTI for RAR reception during a RAR window.

16 Claims, 12 Drawing Sheets

(56) References Cited

OTHER PUBLICATIONS

3rd Generation Partnership Project (3GPP), "Technical Specification Group Radio Access Network; Evolved Universal Terrestrial Radio Access (E-UTRA); Medium Access Control (MAC) protocol specification (Release 13)," 3GPP TS 36.321 V13.0.0, Dec. 2015, 82 pages.
NTT DOCOMO, "Paging for BW reduced low complexity UEs", 3GPP TSG RAN WG2 Meeting #90, R2-152191, May 2015, 6 pages.

(a) Control-Plane Protocol Stack (b) User-Plane Protocol Stack

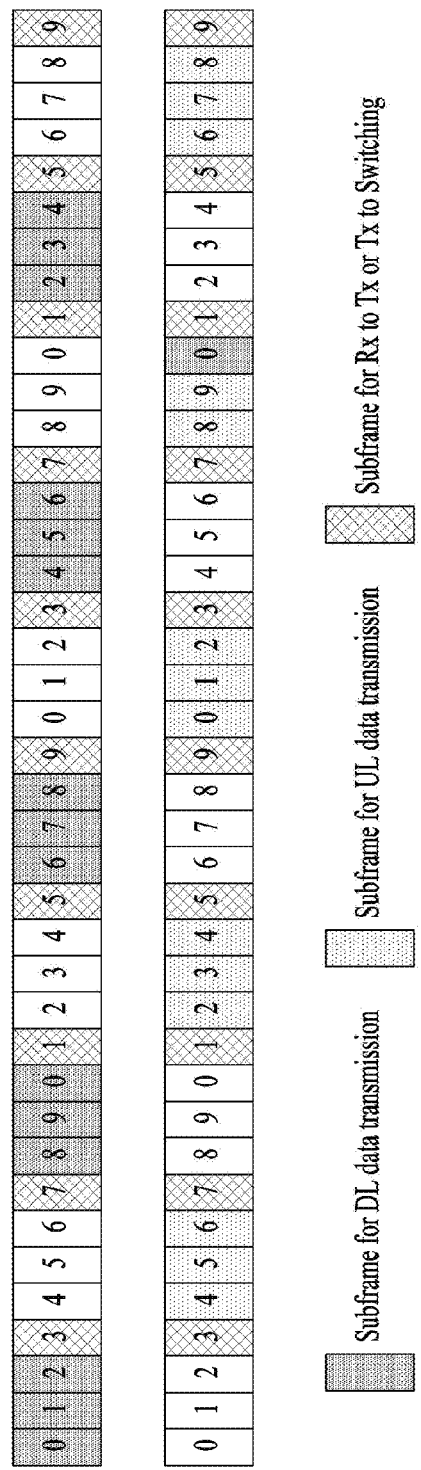

METHOD FOR PERFORMING A RANDOM ACCESS PROCEDURE IN WIRELESS COMMUNICATION SYSTEM AND A DEVICE THEREFOR

CROSS-REFERENCE TO RELATED APPLICATIONS

Pursuant to 35 U.S.C. § 119(e), this application claims the benefit of U.S. Provisional Patent Application Nos. 62/286,983, filed on Jan. 26, 2016 and 62/291,533, filed on Feb. 5, 2016, the contents of which are all hereby incorporated by reference herein in their entirety.

BACKGROUND OF THE INVENTION

Field of the Invention

The present invention relates to a wireless communication system and, more particularly, to a method for performing a random access procedure in wireless communication system and a device therefor.

Discussion of the Related Art

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. Details of the technical specifications of UMTS and E-UMTS are provided in Release 7 and Release 8 of "3rd Generation Partnership Project; Technical Specification Group Radio Access Network", for example.

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

SUMMARY OF THE INVENTION

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIG. 6A is an example for data transmission and reception for a Category 0 low complexity UE.

DETAILED DESCRIPTION OF THE INVENTION

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described in the context of a long term evolution (LTE) system and a LTE-advanced (LTE-A) system in the present specification, they are purely exemplary. Therefore, the embodiments of the present invention are applicable to any other communication system corresponding to the above definition. An exemplary system in which the invention disclosed herein may be implemented is a system compliant with the 3GPP specification TS 36.321 Version 12.6.0. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
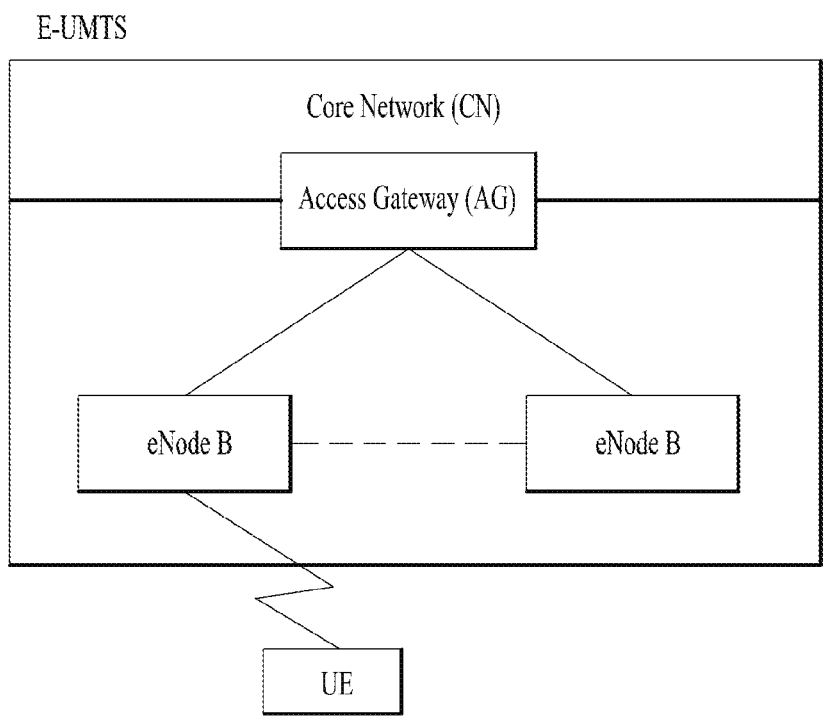
FIG. 1 is a diagram showing a network structure of an Evolved Universal Mobile Telecommunications System (E-UMTS) as an example of a wireless communication system.
Figure 2A:
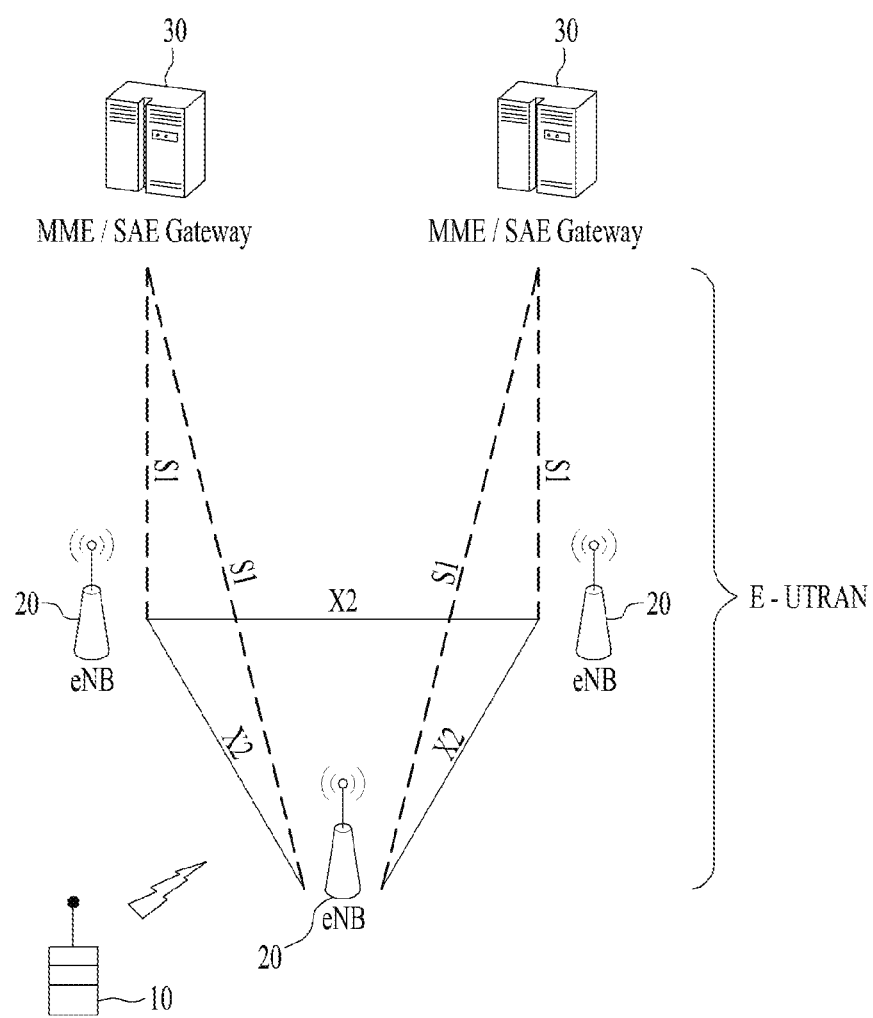
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
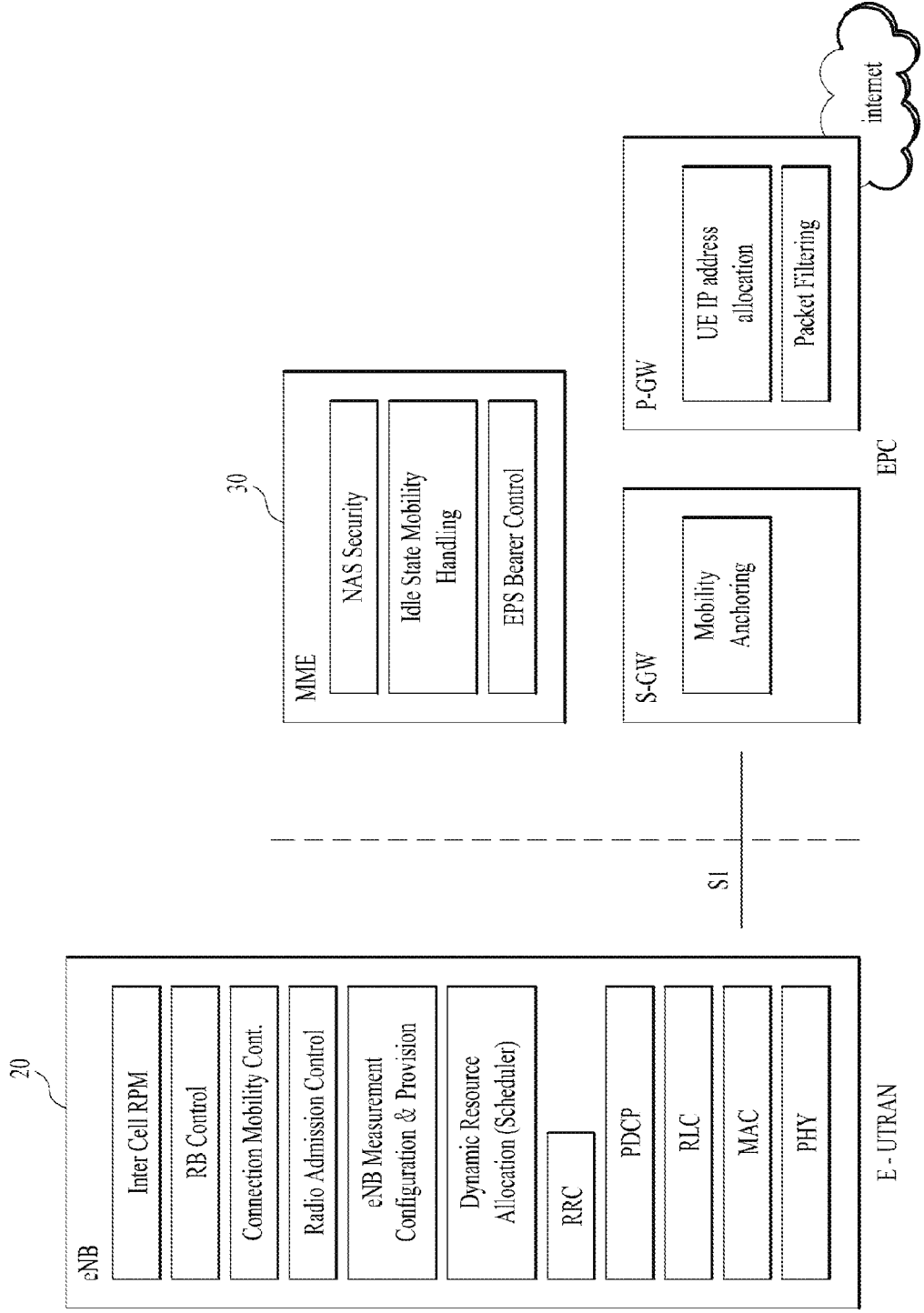
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
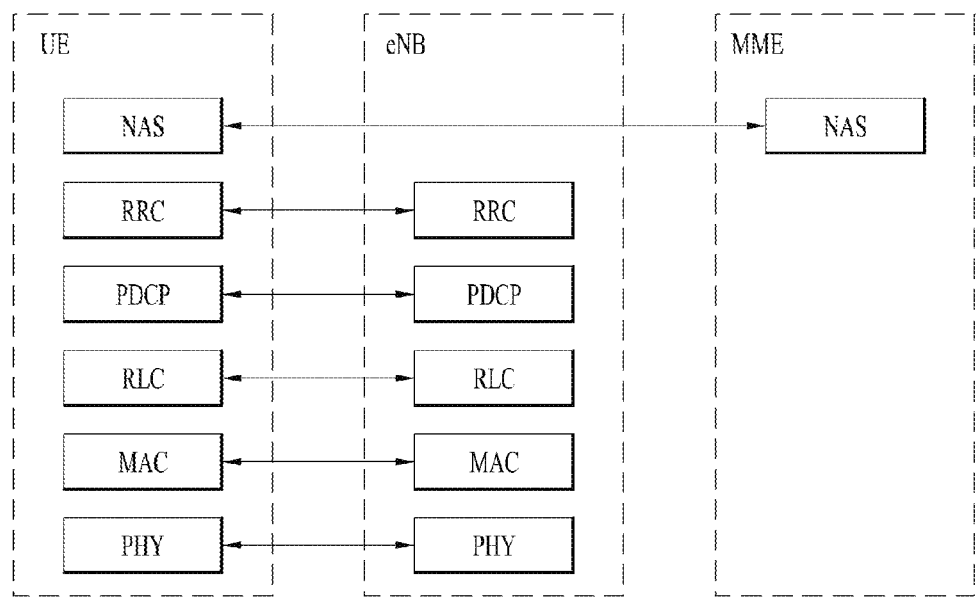
FIG. 3 is a diagram showing a control plane and a user plane of a radio interface protocol between a UE and an E-UTRAN based on a 3rd generation partnership project (3GPP) radio access network standard.
Figure 3:
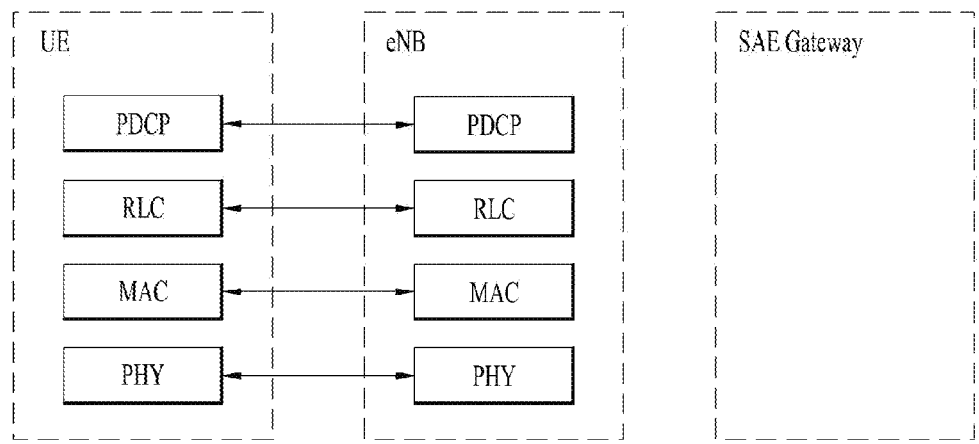

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
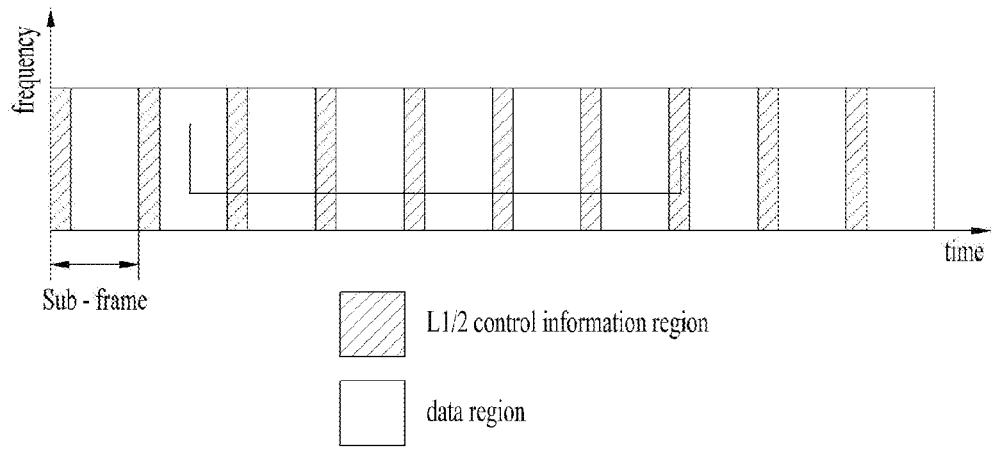
FIG. 4 is a diagram of an example physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
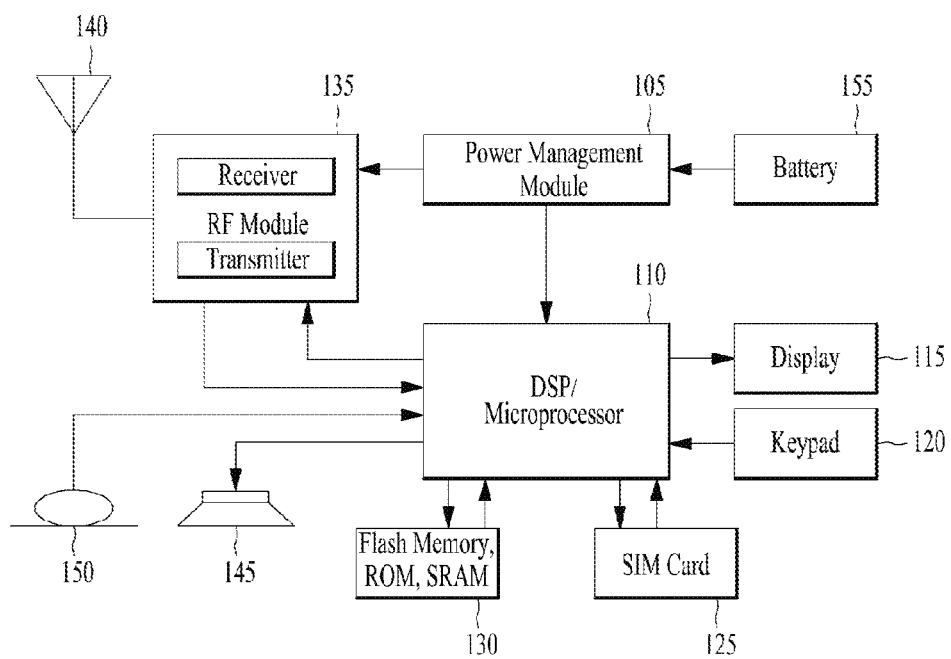
FIG. 5 is a block diagram of a communication apparatus according to an embodiment of the present invention.

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

Figure 6B:
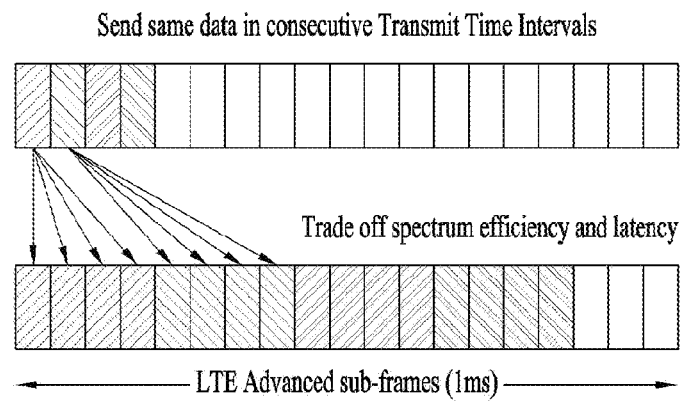
FIG. 6B is an example for repetitions for data transmission for a Category 0 low complexity UE.

FIG. 6A is an example for data transmission and reception for a Category 0 low complexity UE, and FIG. 6B is an example for repetitions for data transmission for a Category 0 low complexity UE.

Such a communication technology as MTC is specialized from 3GPP to transmit and receive IoT-based information and the MTC has a difference according to each release of the technology. Release 10 and Release 11 are focusing on a method of controlling loads of IoT (M2M) products and a method of making the loads have least influence on a network when the IoT products make a request for accessing an eNB at the same time. Release 12 and Release 13 are focusing on a low-cost technology enabling a battery to be simply implemented and very little used by reducing complicated functions mounted on a legacy smartphone as many as possible.

Low complexity UEs are targeted to low-end (e.g. low average revenue per user, low data rate, delay tolerant) applications, e.g. some Machine-Type Communications.

A low complexity UE has reduced Tx and Rx capabilities compared to other UE of different categories.

In particular, a low complexity UE does not require such a function of high performance as a function of a smartphone and an amount of data used by the low complexity UE is not that big in general. Hence, there is no reason for a complicated and high-price communication module to come to the market for such a UE as the low complexity UE.

In order to manufacture a low-cost IoT (M2M) device, a concept such as UE Category 0 has been introduced. A UE category corresponds to a general figure used in 3GPP to indicate the amount of data capable of being processed by a UE in a communication modem. In general, as the amount of data to be processed is getting bigger, a price of a modem is also increasing due to a memory or performance enhancement. In case of a currently commercialized smartphone, performance of the smartphone is continuously increasing from 100 Mbps to 150 Mbps and 300 Mbps on the basis of download.

Table 1 shows UE categories used in 3GPP.

TABLE 1

| UE Category | Downlink (velocity) | Uplink (velocity) | UE Category | Downlink (velocity) | Uplink (velocity) |
|---|---|---|---|---|---|
| 0 | 1 Mbps | 1 Mbps | 7 | 300 Mbps | 100 Mbps |
| 1 | 10 Mbps | 5 Mbps | 8 | 3 Gbps | 1.5 Gbp |
| 2 | 50 Mbps | 25 Mbps | 9 | 450 Mbps | 50 Mbps |
| 3 | 100 Mbps | 50 Mbps | 10 | 450 Mbps | 100 Mbps |
| 4 | 150 Mbps | 50 Mbps | 11 | 600 Mbps | 50 Mbps |
| 5 | 300 Mbps | 75 Mbps | 12 | 600 Mbps | 100 Mbps |
| 6 | 300 Mbps | 50 Mbps | 13 | 400 Mbps | 50 Mbps |

A Category 0 low complexity UE may access a cell only if SIB1 indicates that access of Category 0 UEs is supported. If the cell does not support access of Category 0 UEs, the UE considers the cell as barred.

The eNB determines that a UE is a Category 0 UE based on the LCID for CCCH and the UE capability.

The S1 signalling has been extended to include the UE Radio Capability for paging. This paging specific capability information is provided by the eNB to the MME, and the MME uses this information to indicate to the eNB that the paging request from the MME concerns a low complexity UE.

And, since it is able to perform transmission and reception on specific time only without performing transmission and reception at the same time like FIG. 6A, it may be able to perform an operation of TDD in FDD (since transmission and reception are not performed at the same time). Additionally, unlike legacy TDD, since it is able to provide sufficient switching time as much as 1 ms to a section at which switching is performed between transmission and reception, it is able to expect a revolutionary cost reduction effect in terms of overall hardware part especially a modem and an RF. On the contrary, according to a regulation of a legacy LTE UE, it is mandatory to use at least 2 or more reception antennas.

First, a bandwidth reduced low complexity (BL) UE can operate in any LTE system bandwidth but with a limited channel bandwidth of 6 PRBs (corresponding to the maximum channel bandwidth available in a 1.4 MHz LTE system) in downlink and uplink.

A BL UE may access a cell only if the MIB of the cell indicates that scheduling information for SIB1 specific for BL UEs is scheduled. If not, the UE considers the cell as barred.

A BL UE receives a separate occurrence of system information blocks (sent using different time/frequency resources). A BL UE has a transport block size (TBS) limited to 1000 bit for broadcast and unicast. The BL UE determines the scheduling information for SIB1 specific for BL UEs based on information in MIB. Scheduling information for other SIBs is given in SIB1 specific for BL UEs. The BCCH modification period for BL UEs is a multiple of the BCCH modification period provided in SIB2. The SIB transmission occasions within an SI-window are provided in the SIB1 specific for BL UEs. A BL UE can acquire SI messages across SI windows. The maximum number of SI messages that can be acquired across SI windows is 4. A BL UE is not required to detect SIB change when in RRC_CONNECTED.

A BL UE is paged based on paging occasions in time domain, and paging narrowbands in frequency domain. The starting subframe of a paging occasion is determined in the same way as the paging occasion in the legacy paging mechanism.

A set of PRACH resources (e.g. time, frequency, preamble), each associated with BL UEs in normal coverage, is provided in SIB. Number of PRACH repetitions and number of maximum preamble transmission attempts for BL UEs in normal coverage are provided in SIB. Time/frequency resources and repetition factor for random access response messages for BL UEs are derived from the used PRACH resources.

Next, a UE in enhanced coverage is a UE that requires the use of enhanced coverage functionality to access the cell. In this release of specification two enhanced coverage modes (mode A, mode B) are supported. The support of enhanced coverage mode A is mandatory for a BL UE.

A UE may access a cell using enhanced coverage functionality only if the MIB of the cell indicates that scheduling information for SIB1 specific for BL UEs is scheduled. System information procedures for UEs in enhanced coverage are identical to the system information procedures for bandwidth reduced low complexity UEs. A UE capable of enhanced coverage acquires, if needed, and uses legacy system information when in normal coverage if it is not a BL UE. A UE capable of enhanced coverage acquires, if needed, and uses system information specific for UEs in enhanced coverage. A UE in enhanced coverage is not required to detect SIB change when in RRC_CONNECTED.

A set of PRACH resources (e.g. time, frequency, preamble); each associated with a coverage enhancement level, is provided in SIB. Number of PRACH repetitions and number of maximum preamble transmission attempts per coverage enhancement level are provided in SIB. UEs in same enhanced coverage level use random access resources associated with the same enhanced coverage level. Time/frequency resources and repetition factor for random access response messages for UEs in enhanced coverage are derived from the used PRACH resources.

A UE in enhanced coverage is paged using the same mechanism for paging BL UEs. The starting subframe of a paging occasion and the repetition pattern (in both time and frequency domain for downlink common control signaling) of that paging occasion are determined irrespective of the UEs enhanced coverage level.

The paging request from the MME for a UE supporting enhanced coverage functionality may contain enhanced coverage level related information and corresponding cell ID.

A UE in RRC_IDLE does not inform the network when it changes the enhanced coverage level.

A UE in enhanced coverage camps on a suitable cell where S criterion for UEs in enhanced coverage is fulfilled. The UE shall re-select to inter-frequency cells in which it is able to operate in normal coverage over cells in which it has to be in enhanced coverage.

Connected mode mobility mechanisms such as measurement reporting, network controlled handover etc., are supported for UEs in enhanced coverage. No additional mechanisms are introduced to support the use of enhanced coverage functionality to access an E-UTRA cell during inter-RAT handovers.

In particular, discussion on a solution for a performance deterioration problem caused by decrease of output power is in progress by considering a scheme of performing repetitive transmission as shown in FIB. 6B or a TTI bundling technology previously used in VoLTE (Voice of LTE, LTE voice call service). Consequently, it might say that it is able to develop a communication module of low complexity through the low-cost IoT (M2M) technology explained in the Release 12 and the low-power IoT (M2M) technology to which the Release 13 is targeting.

Figure 7:
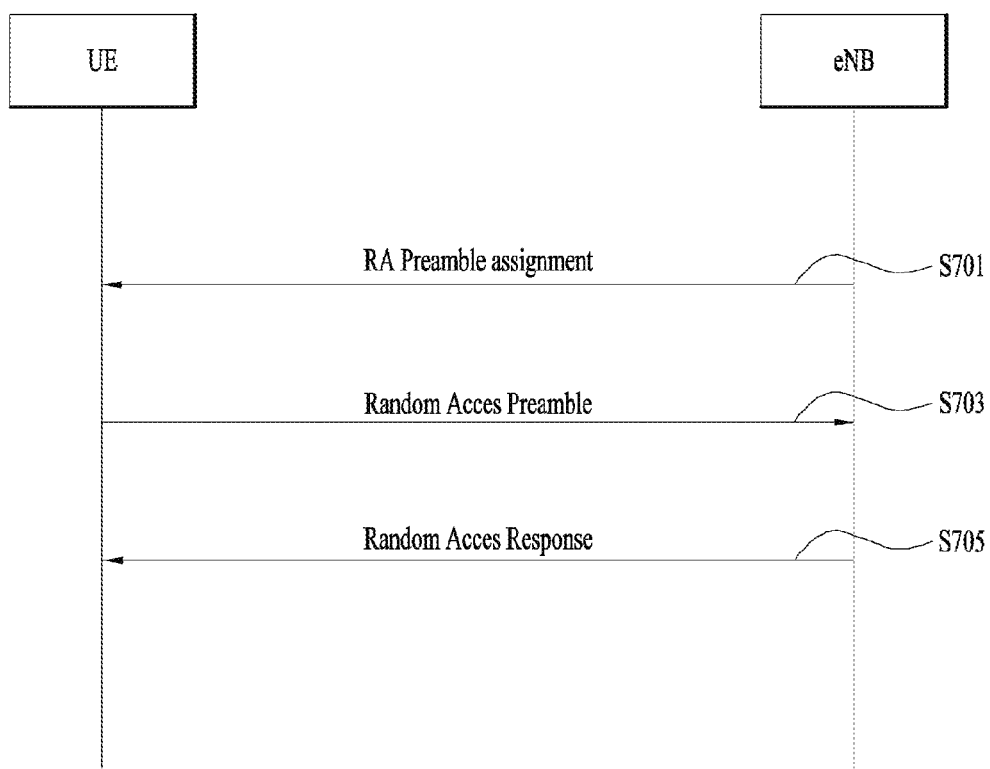
FIG. 7 is a diagram for an example method for performing a non-contention-based random access procedure.
Figure 8:
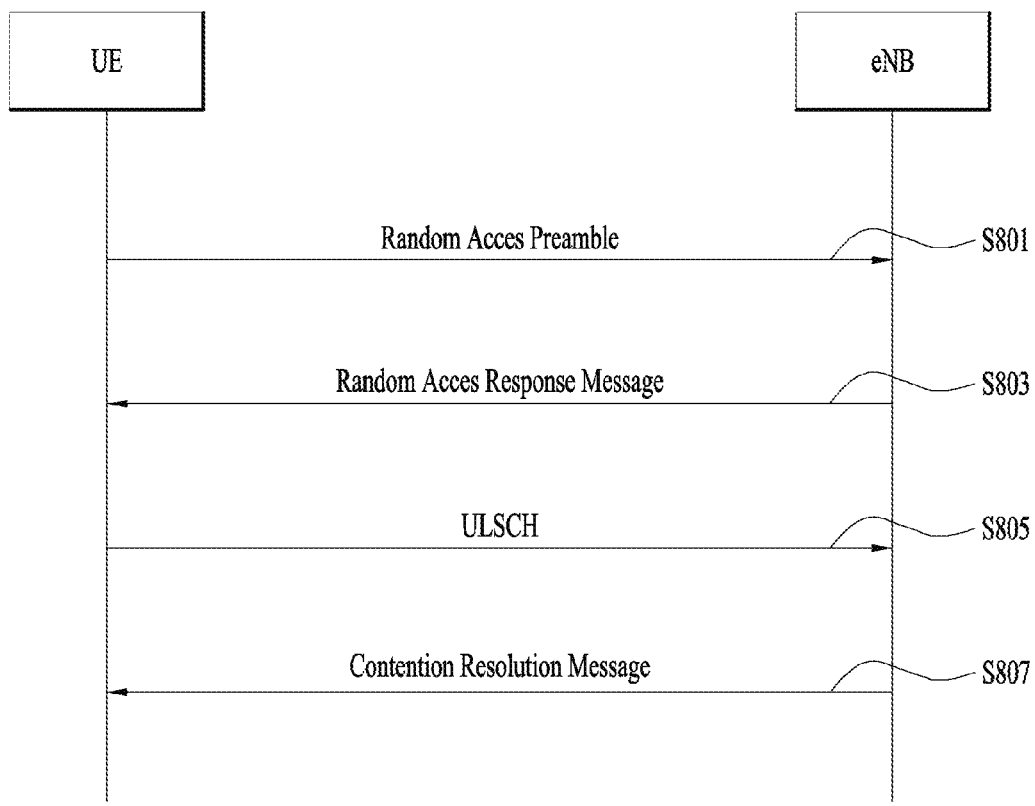
FIG. 8 is a diagram for an example method for performing a contention-based random access procedure.

FIGS. 7 and 8 are views illustrating an operating procedure of a terminal (UE) and a base station (eNB) in random access procedure. FIG. 7 is corresponding to non-contention based random access procedure and FIG. 8 is corresponding to contention based random access procedure.

The random access procedure takes two distinct forms. One is a contention based (applicable to first five events) random access procedure and the other one is a non-contention based (applicable to only handover, DL data arrival and positioning) random access procedure. The non-contention based random access procedure is also called as dedicated RACH process.

The random access procedure is performed for the following events related to the PCell: i) initial access from RRC_IDLE; ii) RRC Connection Re-establishment procedure; iii) Handover; iv) DL data arrival during RRC_CONNECTED requiring random access procedure (e.g. when UL synchronisation status is "non-synchronised".), v) UL data arrival during RRC_CONNECTED requiring random access procedure (e.g. when UL synchronisation status is "non-synchronised" or there are no PUCCH resources for SR available.), and vi) For positioning purpose during RRC_CONNECTED requiring random access procedure; (e.g. when timing advance is needed for UE positioning.)

The random access procedure is also performed on a SCell to establish time alignment for the corresponding sTAG.

Regarding FIG. 7, FIG. 7 shows the non-contention based random access procedure. As described above, a non-contention based random access procedure may be performed in a handover procedure and when the random access procedure is requested by a command of an eNode B. Even in these cases, a contention based random access procedure may be performed.

First, it is important that a specific random access preamble without the possibility of collision is received from the eNode B, for the non-contention based random access procedure.

The UE receives an assigned random access preamble (S701). Methods of receiving the random access preamble may include a method using HO command generated by target eNB and sent via source eNB for handover, a method using a Physical Downlink Control Channel (PDCCH) in case of DL data arrival or positioning, and PDCCH for initial UL time alignment for a sTAG.

The UE transmits the preamble to the eNode B after receiving the assigned random access preamble from the eNode B as described above (S703).

The UE attempts to receive a random access response within a random access response reception window indicated by the eNode B through a handover command or system information after transmitting the random access preamble in step S703 (S705). More specifically, the random access response information may be transmitted in the form of a Medium Access Control (MAC) Packet Data Unit (PDU), and the MAC PDU may be transferred via a Physical Downlink Shared Channel (PDSCH). In addition, the UE preferably monitors the PDCCH in order to enable to the UE to properly receive the information transferred via the PDSCH. That is, the PDCCH may preferably include information about a UE that should receive the PDSCH, frequency and time information of radio resources of the PDSCH, a transfer format of the PDSCH, and the like. Here, if the PDCCH has been successfully received, the UE may appropriately receive the random access response transmitted on the PDSCH according to information of the PDCCH. The random access response may include a random access preamble identifier (e.g. Random Access-Radio Network Temporary Identifier (RA-RNTI)), an UL Grant indicating uplink radio resources, a temporary C-RNTI, a Time Advance Command (TAC), and the like.

As described above, the reason why the random access response includes the random access preamble identifier is because a single random access response may include random access response information of at least one UE and thus it is reported to which UE the UL Grant, the Temporary C-RNTI and the TAC are valid. In this step, it is assumed that the UE selects a random access preamble identifier matched to the random access preamble selected by the UE in step S703.

In the non-contention based random access procedure, it is determined that the random access procedure is normally performed, by receiving the random access response information, and the random access procedure may be finished.

When performing non-contention based random access on the PCell while CA is configured, the Random Access Preamble assignment via PDCCH of steps S701, S703 and S1105 of the non-contention based random access procedure occur on the PCell. In order to establish timing advance for a sTAG, the eNB may initiate a non-contention based random access procedure with a PDCCH order (S7101) that is sent on a scheduling cell of activated SCell of the sTAG. Preamble transmission (S703) is on the indicated SCell and Random Access Response (S705) takes place on PCell.

FIG. 8 is a view illustrating an operating procedure of a UE and an eNB in a contention based random access procedure.

First, the UE may randomly select a single random access preamble from a set of random access preambles indicated through system information or a handover command, and select and transmit a Physical Random Access Channel (PRACH) capable of transmitting the random access preamble (S801).

There are two possible groups defined and one is optional. If both groups are configured the size of message 3 and the pathloss are used to determine which group a preamble is selected from. The group to which a preamble belongs provides an indication of the size of the message 3 and the radio conditions at the UE. The preamble group information along with the necessary thresholds are broadcast on system information.

A method of receiving random access response information is similar to the above-described non-contention based random access procedure. That is, the UE attempts to receive its own random access response within a random access response reception window indicated by the eNode B through the system information or the handover command, after the random access preamble is transmitted in step S801, and receives a Physical Downlink Shared Channel (PDSCH) using random access identifier information corresponding thereto (S803). Accordingly, the UE may receive a UL Grant, a Temporary C-RNTI, a TAC and the like.

If the UE has received the random access response valid for the UE, the UE may process all of the information included in the random access response. That is, the UE applies the TAC, and stores the temporary C-RNTI. In addition, data which will be transmitted in correspondence with the reception of the valid random access response may be stored in a Msg3 buffer.

The UE uses the received UL Grant so as to transmit the data (that is, the message 3) to the eNode B (S805). The message 3 should include a UE identifier. In the contention based random access procedure, the eNode B may not determine which UEs are performing the random access procedure, but later the UEs should be identified for contention resolution.

Here, two different schemes for including the UE identifier may be provided. A first scheme is to transmit the UE's cell identifier through an uplink transmission signal corresponding to the UL Grant if the UE has already received a valid cell identifier allocated by a corresponding cell prior to the random access procedure. Conversely, the second scheme is to transmit the UE's unique identifier (e.g., S-TMSI or random ID) if the UE has not received a valid cell identifier prior to the random access procedure. In general, the unique identifier is longer than the cell identifier. If the UE has transmitted data corresponding to the UL Grant, the UE starts a contention resolution (CR) timer.

After transmitting the data with its identifier through the UL Grant included in the random access response, the UE waits for an indication (instruction) from the eNode B for contention resolution. That is, the UE attempts to receive the PDCCH so as to receive a specific message (S1207). Here, there are two schemes to receive the PDCCH. As described above, the UE attempts to receive the PDCCH using its own cell identifier if the message 3 transmitted in correspondence with the UL Grant is transmitted using the UE's cell identifier, and the UE attempts to receive the PDCCH using the temporary C-RNTI included in the random access response if the identifier is its unique identifier. Thereafter, in the former scheme, if the PDCCH is received through its own cell identifier before the contention resolution timer is expired, the UE determines that the random access procedure has been normally performed and completes the random access procedure. In the latter scheme, if the PDCCH is received through the temporary C-RNTI before the contention resolution timer has expired, the UE checks data transferred by the PDSCH indicated by the PDCCH. If the unique identifier of the UE is included in the data, the UE determines that the random access procedure has been normally performed and completes the random access procedure.

The Temporary C-RNTI is promoted to C-RNTI for a UE which detects RA success and does not already have a C-RNTI; it is dropped by others. A UE which detects RA success and already has a C-RNTI, resumes using its C-RNTI.

When CA is configured, the first three steps of the contention based random access procedures occur on the PCell while contention resolution (S807) can be cross-scheduled by the PCell.

Figure 9:
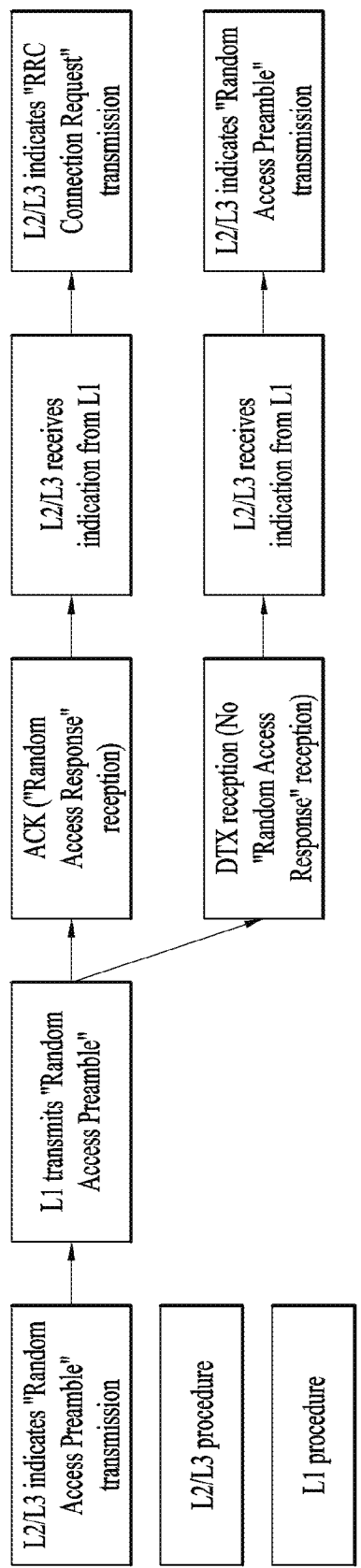
FIG. 9 is a view illustrating for interaction model between L1 and L2/3 for Random Access Procedure.

FIG. 9 is a view illustrating for interaction model between L1 and L2/3 for Random Access Procedure.

Random access procedure described above is modelled in FIG. 9 below from L1 and L2/3 interaction point of view. L2/L3 receives indication from L1 whether ACK is received or DTX is detected after indication of Random Access Preamble transmission to L1. L2/3 indicates L1 to transmit first scheduled UL transmission (RRC Connection Request in case of initial access) if necessary or Random Access Preamble based on the indication from L1.

Random Access Procedure Initialization:

The Random Access procedure described in this sub-clause is initiated by a PDCCH order, by the MAC sublayer itself or by the RRC sublayer. Random Access procedure on an SCell shall only be initiated by a PDCCH order. If a MAC entity receives a PDCCH transmission consistent with a PDCCH order masked with its C-RNTI, and for a specific Serving Cell, the MAC entity shall initiate a Random Access procedure on this Serving Cell. For Random Access on the SpCell a PDCCH order or RRC optionally indicate the ra-PreambleIndex and the ra-PRACH-MaskIndex; and for Random Access on an SCell, the PDCCH order indicates the ra-PreambleIndex with a value different from 000000 and the ra-PRACH-MaskIndex. For the pTAG preamble transmission on PRACH and reception of a PDCCH order are only supported for SpCell.

The Random Access procedure shall be performed as follows: flushing the Msg3 buffer, and setting the PREAMBLE_TRANSMISSION_COUNTER to 1.

If the UE is a BL UE or a UE in enhanced coverage, the Random Access procedure shall be performed as setting the PREAMBLE_TRANSMISSION_COUNTER CE to 1, and if Random Access Preambles group C exists and the measured RSRP is equal to or more than RSRP-ThresholdPrach (1) then, the MAC entity selects the Random Access Preambles group C and the corresponding ra-ResponseWindowSize-v13xy and mac-ContentionResolutionTimer-v13xy. Else if Random Access Preambles group D exists and the measured RSRP is equal to or more than RSRP-ThresholdPrach(2) then, the MAC entity selects the Random Access Preambles group D and the corresponding ra-ResponseWindowSize-v13xy and mac-ContentionResolutionTimer-v13 xy. Else if Random Access Preambles group E exists and the measured RSRP is equal to or more than RSRP-ThresholdPrach(3) then, the MAC entity selects the Random Access Preambles group E and the corresponding ra-ResponseWindowSize-v13 xy and mac-Contention- ResolutionTimer-v13xy. Else if Random Access Preambles group F exists then, the MAC entity selects the Random Access Preambles group F and the corresponding ra-ResponseWindowSize-v13xy and mac-ContentionResolutionTimer-v13 xy. And the Random Access procedure shall be performed further as setting the backoff parameter value to 0 ms, and proceeding to the selection of the Random Access Resource.

Random Access Resource Selection:

The Random Access Resource selection procedure shall be performed as follows:

If ra-PreambleIndex (Random Access Preamble) and ra-PRACH-MaskIndex (PRACH Mask Index) have been explicitly signalled and ra-PreambleIndex is not 000000, the Random Access Preamble and the PRACH Mask Index are those explicitly signaled.

Else the Random Access Preamble shall be selected by the MAC entity as follows:

i) If Msg3 has not yet been transmitted, the MAC entity shall except for BL UEs or UEs in enhanced coverage select the Random Access Preambles group B, if Random Access Preambles group B exists and if the potential message size (UL data available for transmission plus MAC header and, where required, MAC control elements) is greater than messageSizeGroupA and if the pathloss is less than PCMAX,c (of the Serving Cell performing the Random Access Procedure)–preambleInitialReceivedTargetPower–deltaPreambleMsg3–messagePowerOffsetGroupB. Else, the MAC entity shall select the Random Access Preambles group A.

ii) Else, if Msg3 is being retransmitted, the MAC entity shall select the same group of Random Access Preambles as was used for the preamble transmission attempt corresponding to the first transmission of Msg3.

iii) the MAC entity shall randomly select a Random Access Preamble within the selected group. The random function shall be such that each of the allowed selections can be chosen with equal probability.

iv) the MAC entity shall set PRACH Mask Index to 0.

Random Access Preamble Transmission:

The random-access procedure shall be performed as follows:

i) if the most recent PRACH enhanced coverage level for the UE is the highest enhanced coverage level supported in the Serving Cell, the MAC entity sets PREAMBLE_RECEIVED_TARGET_POWER to preambleInitialReceivedTargetPower+DELTA_PREAMBLE+P-Max.

ii) else, the MAC entity sets PREAMBLE_RECEIVED_TARGET_POWER to preambleInitialReceivedTargetPower+DELTA_PREAMBLE+(PREAMBLE_TRANSMISSION_COUNTER−1)*powerRampingStep.

iii) if the UE is a BL UE or a UE in enhanced coverage, the MAC entity instructs the physical layer to transmit a preamble with the number of repetitions required for preamble transmission corresponding to the selected preamble group (i.e., numRepetitionPerPreambleAttempt) using the selected PRACH, corresponding RA-RNTI, preamble index, and PREAMBLE_RECEIVED_TARGET_POWER.

iv) else, the MAC entity instructs the physical layer to transmit a preamble using the selected PRACH, corresponding RA-RNTI, preamble index and PREAMBLE_RECEIVED_TARGET_POWER.

Random Access Response Reception:

Once the Random Access Preamble is transmitted and regardless of the possible occurrence of a measurement gap, the MAC entity shall monitor the PDCCH of the SpCell for Random Access Response(s) identified by the RA-RNTI defined below, in the RA Response window which starts at the subframe that contains the end of the preamble transmission plus three subframes and has length ra-ResponseWindowSize subframes. If the UE is a bandwidth reduced low complexity UE or a UE in enhanced coverage, RA Response window has length ra-ResponseWindowSize-v13xy subframes for the corresponding coverage level. The RA-RNTI associated with the PRACH in which the Random Access Preamble is transmitted, is computed as: RA-RNTI=1+t_id+10*f_id.

Where t_id is the index of the first subframe of the specified PRACH (0≤t_id<10), and f_id is the index of the specified PRACH within that subframe, in ascending order of frequency domain (0≤f_id<6). The MAC entity may stop monitoring for Random Access Response(s) after successful reception of a Random Access Response containing Random Access Preamble identifiers that matches the transmitted Random Access Preamble.

If a downlink assignment for this TTI has been received on the PDCCH for the RA-RNTI and the received TB is successfully decoded, the MAC entity shall regardless of the possible occurrence of a measurement gap, and if the Random Access Response contains a Backoff Indicator subheader, the UE sets the backoff parameter value as indicated by the BI field of the Backoff Indicator subheader. Else, the UE sets the backoff parameter value to 0 ms.

If the Random Access Response contains a Random Access Preamble identifier corresponding to the transmitted Random Access Preamble, the MAC entity shall consider this Random Access Response reception successful and apply the following actions for the serving cell where the Random Access Preamble was transmitted: processing the received Timing Advance Command, indicating the preambleInitialReceivedTargetPower and the amount of power ramping applied to the latest preamble transmission to lower layers (i.e., (PREAMBLE_TRANSMISSION_COUNTER−1)*powerRampingStep); and processing the received UL grant value and indicate it to the lower layers.

If ra-PreambleIndex was explicitly signalled and it was not 000000 (i.e., not selected by MAC), the MAC entity shall consider the Random Access procedure successfully completed.

Else, if the Random Access Preamble was selected by the MAC entity, the MAC entity sets the Temporary C-RNTI to the value received in the Random Access Response message no later than at the time of the first transmission corresponding to the UL grant provided in the Random Access Response message. If this is the first successfully received Random Access Response within this Random Access procedure, and if the transmission is not being made for the CCCH logical channel, indicate to the Multiplexing and assembly entity to include a C-RNTI MAC control element in the subsequent uplink transmission, the MAC entity should obtain the MAC PDU to transmit from the "Multiplexing and assembly" entity and store it in the Msg3 buffer.

If no Random Access Response is received within the RA Response window, or if none of all received Random Access Responses contains a Random Access Preamble identifier corresponding to the transmitted Random Access Preamble, the Random Access Response reception is considered not successful and the MAC entity shall increment PREAMBLE_TRANSMISSION_COUNTER by 1, if the notification of power ramping suspension has not been received from lower layers.

If the UE is a BL UE or a UE in enhanced coverage: if PREAMBLE_TRANSMISSION_COUNTER=preamble TransMax-CE+1, the MAC entity shall indicate a Random Access problem to upper layers, if the Random Access Preamble is transmitted on the SpCell, or the MAC entity shall consider the Random Access procedure unsuccessfully completed, if the Random Access Preamble is transmitted on an SCell.

If the UE is not a BL UE or a UE in enhanced coverage, if PREAMBLE_TRANSMISSION_COUNTER= preambleTransMax+1, the MAC entity shall indicate a Random Access problem to upper layers, if the Random Access Preamble is transmitted on the SpCell, or the MAC entity shall consider the Random Access procedure unsuccessfully completed if the Random Access Preamble is transmitted on an SCell.

If in this Random Access procedure, the Random Access Preamble was selected by MAC, the MAC entity shall select a random backoff time according to a uniform distribution between 0 and the Backoff Parameter Value based on the backoff parameter, and delay the subsequent Random Access transmission by the backoff time.

Once the preamble is transmitted the UE monitors for PDCCH identified with RA-RNTI, which is calculated as RA-RNTI=1+t_id+10*f_id.

Currently t_id is applicable to both frame structures (TDD and FDD) where based on the PRACH Configuration Index the UE has various options in which subframe the preamble transmission is started. f_id is only applicable to frame structure format 2 (TDD) where indices >0 indicate that random access opportunities are additionally frequency multiplexed.

If RA response window length is extended, then it can be possible that two different UEs starting the PRACH preamble transmissions in separate radio frames, but on same subframe number, will use the same RA-RNTI during overlapping RA response windows. This can lead to a UE searching for M-PDCCH using the same RA-RNTI, and reading DCI not meant for that UE, thus potentially leading to higher contention probability. To avoid this issue, we propose to change the RA-RNTI calculation for LC/CE UEs so that this ambiguity is resolved.

If the RA-RNTI calculation is modified, then the following parameters could be taken into account: i) the used PRACH opportunity, t_id could be reused for this, ii) the used narrowband, new parameter, e.g. n_id could denote the used narrowband, and iii) PRACH repetition factor, e.g. r_id, indicating the used repetition factor.

Existing parameter f_id can be used to indicate the used frequency for TDD operation.

If multiple different narrowbands are used to send PRACH preambles and the corresponding RARs are sent using same the RAR narrowband, then the narrowband index n_id should be included in the calculation. If, however, the RARs are sent in separate narrowbands, so that there is no ambiguity on which RAR corresponds to which narrowband used to send PRACH, then n_id should not be needed.

Using the definitions above, the RA-RNTI could, for example, be calculated as: RA-RNTI=t_id+k1*f_id+k2*n_id+k3*r_id, where constants k1, k2 and k3 are chosen so that the RA-RNTI values are distinct for different index values. The existing RA-RNTI range needs probably to be extended in order to capture all of above.

Figure 10:
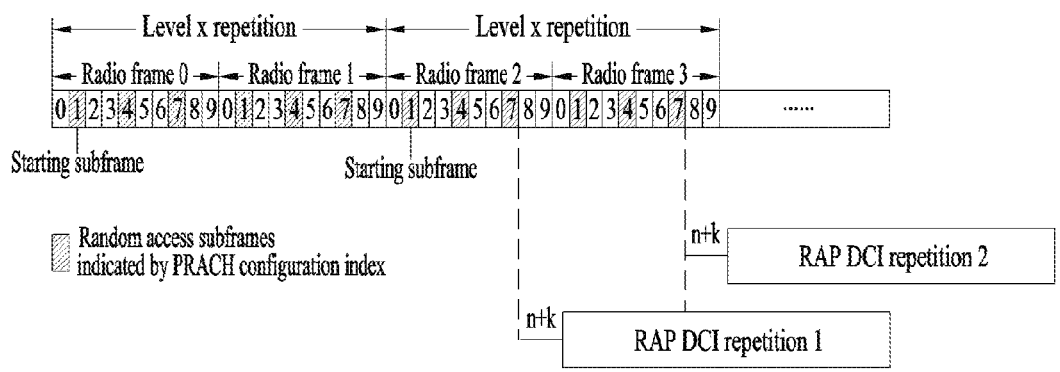
FIG. 10 is an example for a problem of RAR window overlap at PRACH repetition.

FIG. 10 is an example for a problem of RAR window overlap at PRACH repetition.

The RAR window duration is extended based on the RAR repetition factor. The intention is to support multiple RAR transmission opportunities. Note that the RAR window duration extension needs to include both M-PDCCH repetition and associated PDSCH repetition. Consequently, the RAR window duration can be long.

According to the latest RRC parameter from RAN1, the starting subframe of PRACH repetition is not explicitly configured. Then the starting subframe of the later PRACH opportunity corresponding to a number of PRACH repetitions starts right after the end of the previous PRACH opportunity.

With fixed timing relationship between the end of PRACH repetition and start of RAR window, RAR windows corresponding to different PRACH opportunities may overlap as shown in FIG. 10.

Furthermore, the legacy RA-RNTI calculation takes only subframe and frequency location of PRACH into account. With PRACH repetition, the subframes of different PRACH opportunities can be the same while the radio frames are different. However, based on current RA-RNTI calculation, the RA-RNTIs may be same for different PRACH opportunities.

Then during the time when RAR windows corresponding to different PRACH opportunities are overlapped, eNB cannot indicate which PRACH opportunity the random access response is for as currently only preamble index is included in MAC RAR.

Therefore, a mechanism to ensure UE to identify the RAR to its PRACH opportunity needs to be introduced. For example, a set of RA-RNTI values can be defined for each PRACH repetition level to distinguish multiple consecutive PRACH opportunities. Other mechanism such as introduce PRACH opportunity indicator in DCI for RAR scheduling or MAC RAR can also be considered.

Figure 11A:
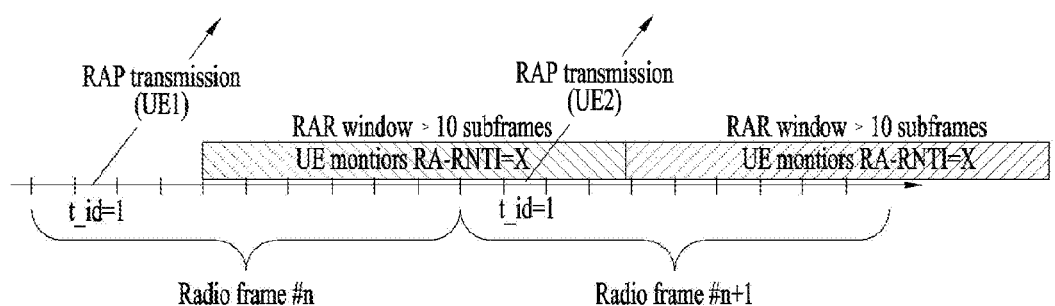
FIG. 11A is an example for RAP transmission using a legacy RAR window (=10 subframes)
Figure 11B:
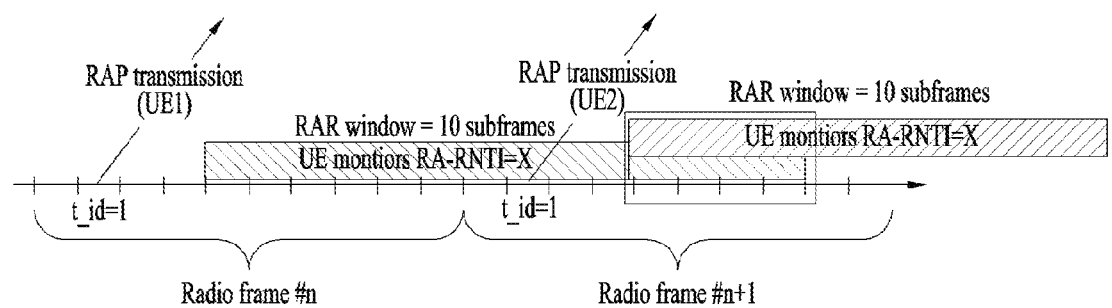
FIG. 11B is an example for RAP transmission using an extended RAR window (>10 subframes).

FIG. 11A is an example for RAP transmission using a legacy RAR window (=10 subframes), and FIG. 11B is an example for RAP transmission using an extended RAR window (>10 subframes).

In LTE, RA-RNTI is calculated based on t_id (0≤t_id<10) and f_id (0≤t_id<6), wherein RA-RNTI value range is 1≤RA-RNTI<61). RA-RNTI only considers the subframe index and doesn't consider the radio frame index. Therefore, RAP transmissions in different radio frames but on the same PRACH resource, i.e., the same t_id and f_id, results in the same RA-RNTI value. However, as the RAR window size is up to 10 subframes, the RAR window for those RAP transmissions are exclusive each other. Therefore, there is no case that different UEs who transmitted RAP in different radio frames but on the same PRACH resource monitor the PDCCH addressed by the same RA-RNTI during the overlapping RAR window (See, FIG. 11A)

For eMTC, repetition transmission/reception is used in order to increase the reliability of low cost UE or the UE in enhanced coverage mode. Therefore, in order to receive the RAR successfully, an extended RAR window is used, wherein the RAR window size is up to 400 subframes. With the current RA-RNTI calculation, there would be a case that the UEs who transmitted RAP on different radio frames but on the same PRACH resource monitor the same RA-RNTI during the overlapping RAR window. (See, FIG. 11B).

Accordingly, the contention probability of RA procedure would increase even for the case that the UEs transmits RAP on different radio frames. Therefore, a new RA-RNTI calculation method is required in order to differentiate the RA-RNTI for RAP transmissions on different radio frames.

Figure 12:
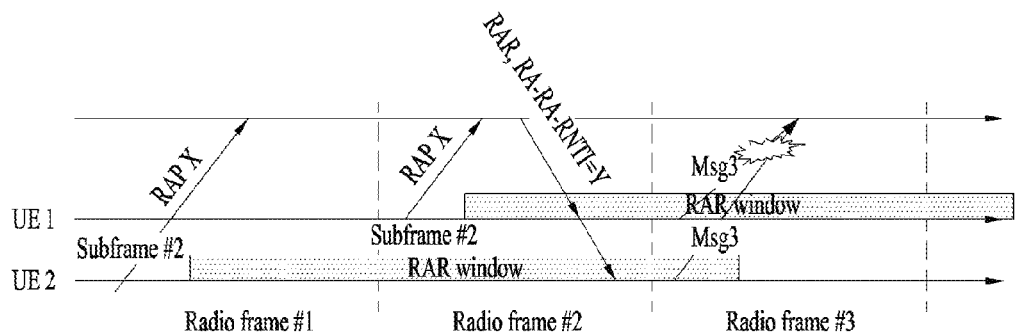
FIG. 12 is an example for Msg3 collision between UEs due to increased RAR window size.

FIG. 12 is an example for Msg3 collision between UEs due to increased RAR window size.

RA-RNTI is used for RAR reception, while successful RAR reception is determined by further checking RAP ID included in RAR. After RAR reception, the UE performs Msg3 transmission by using the UL grant received in RAR only when RAR reception is successful. Therefore, use of the same RA-RNTI within the overlapping RAR window does not always mean that Msg3 transmission is collided. In this sense, in RA, what is important is to design RA in a way that collision of Msg3 transmission is minimized.

According to the current RA-RNTI calculation and RAR window size (maximum sf10), collision of Msg3 transmission can be observed only if different UEs transmit the same RAP on the same PRACH resource, i.e., the same t_id and f_id, within the same radio frame (case 1). There is no collision of Msg3, if different UEs transmit different RAPs on the same PRACH resource within the same radio frame (case 2), or different UEs transmit the same RAP on the different PRACH resources within the same radio frame (case 3), or different UEs transmit the same RAP on the same PRACH resource in different radio frames (case 4), or different UEs transmit different RAPs on different PRACH resources within the same radio frame (case 5), or different UEs transmit different RAPs on the same PRACH resources in different radio frame (case 6), or different UEs transmit the same RAP on the different PRACH resources in different radio frames (case 7), or different UEs transmit different RAPs on different PRACH resources in different radio frames (case 8).

For eMTC, RAN2 decided to extend the RAR window size up to sf400. Then, with the current RA-RNTI, there would be a case that the same RA-RNTI is used for the UEs who transmitted the same RAP on the same PRACH resource even in different radio frames (case 4), accordingly, lead to collision of Msg3 transmission even in case 4 (See, FIG. 12).

This would increase the collision probability of Msg3 transmission. Considering the increased RAR window size, the collision probability may largely increase. Therefore, we need to resolve the collision of Msg3 due to the increased RAR window size.

In eMTC, as observed, case 4 is the only additional case that causes collision of Msg3. Thus, it would be good to focus on resolving collision of Msg3 in case 4 unless it is justified to resolve it also in case 1.

Figure 13:
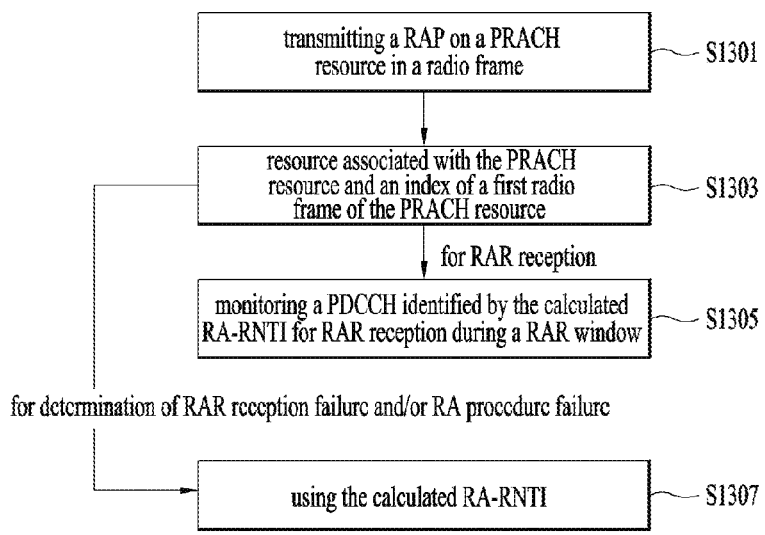
FIG. 13 is a conceptual diagram for performing a random access for multiple repetition transmission in wireless communication system according to embodiments of the present invention.

FIG. 13 is a conceptual diagram for performing a random access for multiple repetition transmission in wireless communication system according to embodiments of the present invention.

It is invented that an UE (e.g. a BL UE or a UE in enhanced coverage) calculates an RA-RNTI by taking the index of radio frame of the first subframe of the specified PRACH into account.

Collision of Msg3 in case 4 (: different UEs transmit the same RAP on the same PRACH resource in different radio frames) stems from that the current RA-RNTI does not differentiate radio frames. Therefore, one simple solution is to use the radio frame number in RA-RNTI calculation. Then, different UEs transmitting the same RAP on the same PRACH resource but in different radio frames can be distinguished by different RA-RNTI.

Note that if the radio frame is used in RA-RNTI calculation, collision of Msg3 is prevented in case 4 regardless of whether the UEs are operating in different or the same CE level. However, collision of Msg3 in case 1 still occurs as in the legacy.

If the UE transmits an RAP on a PRACH resource in a radio frame (S1301), the UE calculates the RA-RNTI by considering time-frequency resource associated with the PRACH resource and an index of a first radio frame of the PRACH resource (S1303).

For RAR reception, the UE monitors the PDCCH identified by the calculated RA-RNTI during the RAR window (S1305). And for determination of RAR reception failure and/or RA procedure failure, the UE uses the calculated RA-RNTI (S1307).

Preferably, the collision of Msg3 in case 4 may occur due to UE performing multiple repetitions of data transmission and reception.

In detail, the UE calculates the RA-RNTI as an Equation A:

$$\text{RA-RNTI}=1+t\_id+10*f\_id+60*s\_id, \qquad \text{[Equation A]}$$

Wherein, 't_id' is an index of a first subframe of the specified PRACH (0≤t_id<10), 'f_id' is an index of the specified PRACH within that subframe, in ascending order of frequency domain (0≤f_id<6), 's_id' is an index of the first radio frame of the specified PRACH (0≤s_id<4096).

Note that the specified PRACH resource refers the PRACH resource for the first transmission of random access preamble (RAP) within an attempt, wherein the UE transmits the RAP for multiple times within one attempt.

When an eNB receives the RA preamble on a PRACH resource in a radio frame, where the index of the first subframe of the PRACH resource is t_id, the index of the PRACH within that subframe is f_id, and the index of the radio frame is s_id, if the eNB successfully receives the RAP, the eNB transmits the RAR including the RAP identifier by using the PDCCH identified by the RA-RNTI which is calculated as RA-RNTI=1+t_id+10*f_id+60*s_id.

By calculating RA-RNTI as RA-RNTI=1+t_id+10*f_id+60*s_id, i) the values range for the RA-RNTI is 1≤RA-RNTI<245761, ii) the RA-RNTI values are consecutive within the RA-RNTI value range, iii) the RA-RNTI values are differently calculated when RAP transmissions are performed on the same PRACH resource but on different radio frames.

In this case, because of the coefficient '60', all RA-RNTIs can be calculated consecutively, but since the different radio frames must be distinguished without any restriction, the range of values of the RA-RNTI may be too broad.

Alternatively, the RA-RNTI can be calculated as an Equation B:

$$\text{RA-RNTI}=1+t\_id+10*f\_id+100*s\_id. \qquad \text{[Equation B]}$$

In this case, i) the value range for the RA-RNTI is 1≤RA-RNTI<409561, ii) the RA-RNTI values are not consecutive within the RA-RNTI value range, and iii) the RA-RNTI values are differently calculated when RAP transmissions are performed on the same PRACH resource but on different radio frames.

Meanwhile, considering the increased RAR window size up to sf400, i.e., 40 radio frames, the required number of RA-RNTI values should be at least 400×6=2400 for TDD and 400 for FDD. Thus, one possible RA-RNTI calculation would be that Equation C:

$$\text{RA-RNTI}=1+t\_id+10*f\_id+60*\text{mod}(r\_id,40), \qquad \text{[Equation C]}$$

where r_id is the index of the first radio frame of the specified PRACH (0≤s_id<4096).

With this RA-RNTI calculation, i) RA-RNTI values are consecutive in the range of RA-RNTI values, ii) the maximum value is 2,400 for TDD and 400 for FDD, iii) the collision of Msg3 happens only when the UEs operating in different or in the same CE level transmits the same RA preamble on the same PRACH resource on the same radio frame, iv) the collision of Msg3 does not happen when the UEs operating in different or in the same CE level transmit the same RA preamble on the same PRACH resource on different radio frames.

The reason for performing the modulo operation using the maximum RAR window size is that, only the radio subframe to be distinguished should be considered when the RAR window overlaps. Therefore, mod (r_id, 40) is used in Equation C because the maximum RAR window size is currently considered as 400 subframes. However, the number of radio frames to be distinguished can be changed according to the number of subframes of the maximum RAR window size.

Since the index of a first radio frame of the PRACH resource wraps around upon reaching a value related to a maximum RAR window size according to the Equation C, the Equation C can be used in the same way as an Equation D.

$$RA\text{-}RNTI = 1 + t\_id + 10 * f\_id + 60 * (SFN\_id \bmod(Wmax/10)).$$ [Equation D]

In this case, because of the coefficient '60', all RA-RNTIs can be calculated consecutively, and since the modulo operation is performed using the maximum RAR window size, the range of values of the RA-RNTI can also be appropriately adjusted.

If RAN2 considers that collision of Msg3 in case 1 should be avoided at least between the UEs operating in different CE levels, then we may consider using CE level in RA-RNTI calculation on top of using the radio frame number. If the radio frame number is not used for RA-RNTI calculation, the collision of Msg3 transmission would still occur in case 4, which has been prevented in the legacy.

Meanwhile, Given that the RAR window size is increased up to sf400 and total eight number of repetition factors is possible, the required number of RA-RNTI values should be at least 400*8*6=19,200 for TDD and 40*8=3,200 for FDD. In this sense, one possible RA-RNTI calculation would be that Equation E:

$$RA\text{-}RNTI = 1 + t\_id + 10 * f\_id + 60 * \bmod(r\_id, 40) + 2400 * c\_id,$$ [Equation E]

where c_id is the index of the repetition number (0≤c_id<8).

With this RA-RNTI calculation, i) RA-RNTI values are consecutive in the range of RA-RNTI values, ii) the maximum value is 19,200 for TDD and 3,200 for FDD, iii) the collision of Msg3 happens only when the UEs operating in the same CE level transmits the same RA preamble on the same PRACH resource on the same radio frame, and iv) the collision of Msg3 does not happen when the UEs operating in different CE level transmit the same RA preamble on the same PRACH resource on different radio frames.

Using CE level in RA-RNTI calculation, collision of Msg3 transmission can be avoided if: i) the UEs operating in different CE levels transmit the same RAP on the same PRACH resource within the same radio frame, i.e., case 1, and ii) the UEs operating in different CE levels transmit the same RAP on the same PRACH resource in different radio frames, i.e., case 4. However, using CE level in RA-RNTI calculation, collision of Msg3 transmission cannot be avoided if the UEs operating in the same CE level transmit the same RAP on the same PRACH resource within the same radio frame, i.e., case 1, and if the UE operating in the same CE level transmit the same RAP on the same PRACH resource in different radio frames, i.e., case 4.

Basically, collision of Msg3 between the UEs operating in different CE level can be prevented by allocating different PRACH resource or RAR reception region per different CE level. We think this was the original intention in allowing configuration of PRACH resource and RAR reception region per CE level. In addition, as seen from be above, using CE level in RA-RNTI calculation cannot completely prevent collision of Msg3 in case 1 and case 4, i.e., collision of Msg3 still occurs between the UEs operating in the same CE level. Moreover, case 1 has occurred in the legacy and we see no reason/motivation to specially handle case 1 only for eMTC. Therefore, we propose CE level is not used for RA-RNTI calculation for eMTC.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the scope of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

What is claimed is:
1. A method for a user equipment (UE) operating in a wireless communication system, the method comprising:
   transmitting a random access preamble (RAP) on a physical random access channel (PRACH) resource in a radio frame;
   calculating a random access-radio network temporary identifier (RA-RNTI) by considering a time-frequency resource associated with the PRACH resource and an index of a first radio frame of the PRACH resource;
   monitoring a physical downlink control channel (PDCCH) identified by the calculated RA-RNTI for a random access response (RAR) reception during a RAR window; and
   receiving the RAR in response to the RAP using the PDCCH identified by the calculated RA-RNTI,
   wherein the calculating the RA-RNTI includes a modulo operation on the index of the first radio frame of the PRACH resource with a value related to a maximum RAR window size.

2. The method according to claim 1, wherein the UE is a Bandwidth reduced Low complexity (BL) UE or a UE in enhanced coverage.

3. The method according to claim 1, wherein the UE is a UE performing multiple repetitions of data transmission and reception.

4. The method according to claim 1,
   wherein the modulo operation on the index of the first radio frame of the PRACH resource with the value related to the maximum RAR window size is system frame number identifier (SFN_id) mod (Wmax/10),
   wherein the SFN_id is the index of the first radio frame of the PRACH resource, and Wmax is a number of subframes corresponding to the maximum RAR window size.

5. The method according to claim 1, wherein the modulo operation comprises equation A:

$$\text{RA-RNTI} = 1 + t\_id + 10 * f\_id + 60 * (\text{SFN}\_id \bmod (W\text{max}/10)) \quad \text{[equation A]}$$

wherein,
   the t_id is an index of a first subframe of the PRACH resource (0<=t_id<10),
   the f_id is an index of the PRACH resource within the first subframe of the PRACH resource (0<=f_id<6),
   the SFN_id is a system frame number identifier that is the index of the first radio frame of the PRACH resource, and
   Wmax is a number of subframes corresponding to the maximum RAR window size.

6. The method according to claim 1, wherein the calculating the RA-RNTI includes calculating consecutive RA-RNTI values.

7. The method according to claim 1, wherein the RA-RNTI is calculated by further considering an index of repetition numbers.

8. The method according to claim 7, wherein the RA modulo operation comprises equation B:

$$\text{RA-RNTI} = 1 + t\_id + 10 * f\_id + 60 * \bmod(\text{SFN}\_id \bmod (W\text{max}/10)) + 2400 * c\_id, \quad \text{[equation B]}$$

wherein,
   the t_id is the index of the first subframe of the PRACH resource (0<=t_id<10),
   the f_id is an index of the PRACH resource within the first subframe of the PRACH resource (0<=f_id<6),
   the SFN_id is a system frame number identifier that is the index of the first radio frame of the PRACH resource,
   Wmax is a number of subframes corresponding to the maximum RAR window size, and
   the c_id is the index of repetition numbers (0≤c_id<8).

9. A User Equipment (UE) for operating in a wireless communication system, the UE comprising:
   a Radio Frequency (RF) module; and
   a processor operably coupled with the RF module and configured to:
   transmit a random access preamble (RAP) on a physical random access channel (PRACH) resource in a radio frame,
   calculate a random access-radio network temporary identifier (RA-RNTI) by considering a time-frequency resource associated with the PRACH resource and an index of a first radio frame of the PRACH resource,
   monitor a physical downlink control channel (PDCCH) identified by the calculated RA-RNTI for a random access response (RAR) reception during a RAR window, and
   receive the RAR in response to the RAP using the PDCCH identified by the calculated RA-RNTI,
   wherein the RA-RNTI is calculated according to a modulo operation on the index of the first radio frame of the PRACH resource with a value related to a maximum RAR window size.

10. The UE according to claim 9, wherein the UE is a Bandwidth reduced Low complexity (BL) UE or a UE in enhanced coverage.

11. The UE according to claim 9, wherein the UE is a UE performing multiple repetitions of data transmission and reception.

12. The UE according to claim 9,
   wherein the modulo operation on the index of the first radio frame of the PRACH resource with the value related to the maximum RAR window size is a system frame number identifier (SFN_id) mod (Wmax/10),
   wherein the SFN_id is the index of the first radio frame of the PRACH resource, and Wmax is a number of subframes corresponding to the maximum RAR window size.

13. The UE according to claim 9, wherein the modulo operation comprises equation A:

$$\text{RA-RNTI} = 1 + t\_id + 10 * f\_id + 60 * (\text{SFN}\_id \bmod (W\text{max}/10)) \quad \text{[equation A]}$$

wherein,
   the t_id is an index of a first subframe of the PRACH resource (0<=t_id<10),
   the f_id is an index of the PRACH resource within the first subframe of the PRACH resource (0<=f_id<6),
   the SFN_id is a system frame number identifier (SFN_id) that is the index of the first radio frame of the PRACH resource, and
   Wmax is a number of subframes corresponding to the maximum RAR window size.

14. The UE according to claim 9, wherein the calculating the RA-RNTI includes calculating consecutive RA-RNTI values.

15. The UE according to claim 9, wherein the RA-RNTI is calculated by further considering an index of repetition numbers.

16. The UE according to claim 15, wherein the RA modulo operation comprises equation B:

$$\text{RA-RNTI} = 1 + t\_id + 10 * f\_id + 60 * \bmod(\text{SFN}\_id \bmod (W\text{max}/10)) + 2400 * c\_id, \quad \text{[equation B]}$$

wherein,
the t_id is the index of the first subframe of the PRACH resource (0<=t_id<10),
the f_id is an index of the PRACH resource within the first subframe of the PRACH resource (0<=f_id<6),
the SFN_id is a system frame number identifier (SFN_id) that is the index of the first radio frame of the PRACH resource,
Wmax is a number of subframes corresponding to the maximum RAR window size, and
the c_id is the index of repetition numbers (0≤id<8).

* * * * *